(12) United States Patent
Fujimori

(10) Patent No.: US 8,083,974 B2
(45) Date of Patent: Dec. 27, 2011

(54) MANUFACTURING METHOD OF LENS ARRAY

(75) Inventor: Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 300 days.

(21) Appl. No.: 11/958,181

(22) Filed: Dec. 17, 2007

(65) Prior Publication Data

US 2008/0105990 A1 May 8, 2008

Related U.S. Application Data

(62) Division of application No. 10/882,288, filed on Jul. 2, 2004, now abandoned.

(30) Foreign Application Priority Data

Jul. 4, 2003 (JP) .................. 2003-191776
May 7, 2004 (JP) .................. 2004-138790

(51) Int. Cl.
  *B29D 11/00* (2006.01)
  *B27N 3/18* (2006.01)
  *C03B 17/00* (2006.01)
  *C03B 13/00* (2006.01)
  *C03B 21/00* (2006.01)
  *C03B 23/00* (2006.01)

(52) U.S. Cl. ............. 264/1.1; 264/319; 65/93; 65/97; 65/105; 65/106; 65/DIG. 3

(58) Field of Classification Search .............. 264/1.32; 65/177, 97, 94

See application file for complete search history.

(56) References Cited

U.S. PATENT DOCUMENTS

| | | | |
|---|---|---|---|
| 3,693,852 A | 9/1972 | Simomura | |
| 3,874,143 A * | 4/1975 | Braber | ............ 53/412 |
| 5,581,379 A * | 12/1996 | Aoyama et al. | ............ 349/5 |
| 6,129,866 A * | 10/2000 | Hamanaka et al. | ............ 264/1.7 |
| 6,313,949 B1 | 11/2001 | Itoh et al. | |
| 2003/0184872 A1 * | 10/2003 | Muto et al. | ............ 359/642 |

FOREIGN PATENT DOCUMENTS

| | | |
|---|---|---|
| CN | 2261321 Y | 9/1997 |
| JP | A-62-278136 | 12/1987 |
| JP | A-01-183611 | 7/1989 |
| JP | H01-183611 A | 7/1989 |
| JP | A-04-213401 | 8/1992 |
| JP | 2001-051102 A | 2/2001 |
| JP | A-2001-166117 | 6/2001 |
| JP | 2002-265226 A | 9/2002 |
| JP | A-2002-328203 | 11/2002 |
| JP | A-2003-048725 | 2/2003 |

* cited by examiner

*Primary Examiner* — Christina Johnson
*Assistant Examiner* — Benjamin Schiffman
(74) *Attorney, Agent, or Firm* — Oliff & Berridge, PLC

(57) ABSTRACT

Molten glass (G) is set and press-molded in a molding die (60) having dies (621A1, 621A2) corresponding to a lens array. After the molding, the molded article is removed from the molding die (60) and separated by bending at a bend-separation face (121C), which is a boundary part of adjacent lens arrays, so that two lens arrays are produced.

6 Claims, 13 Drawing Sheets

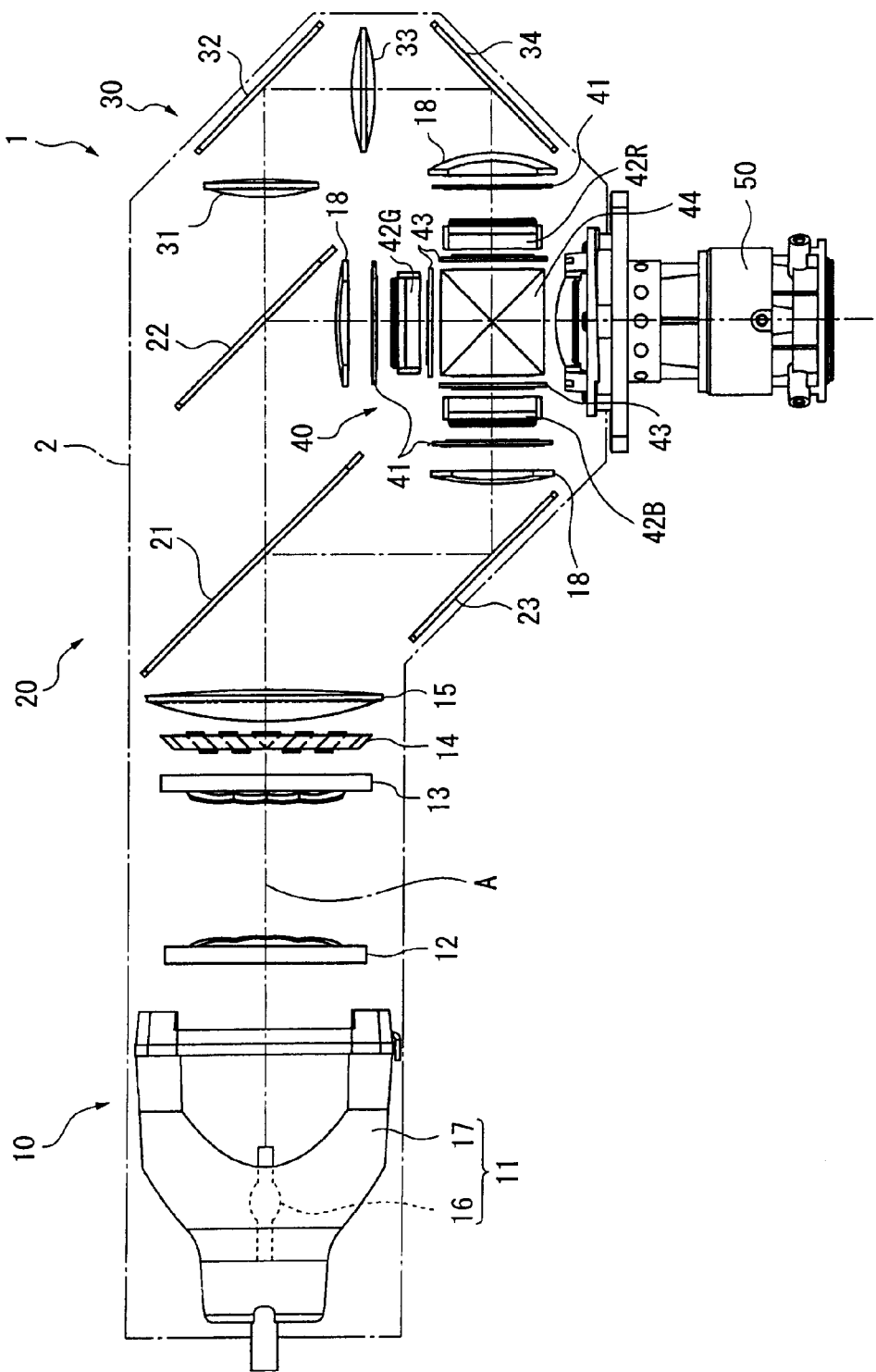

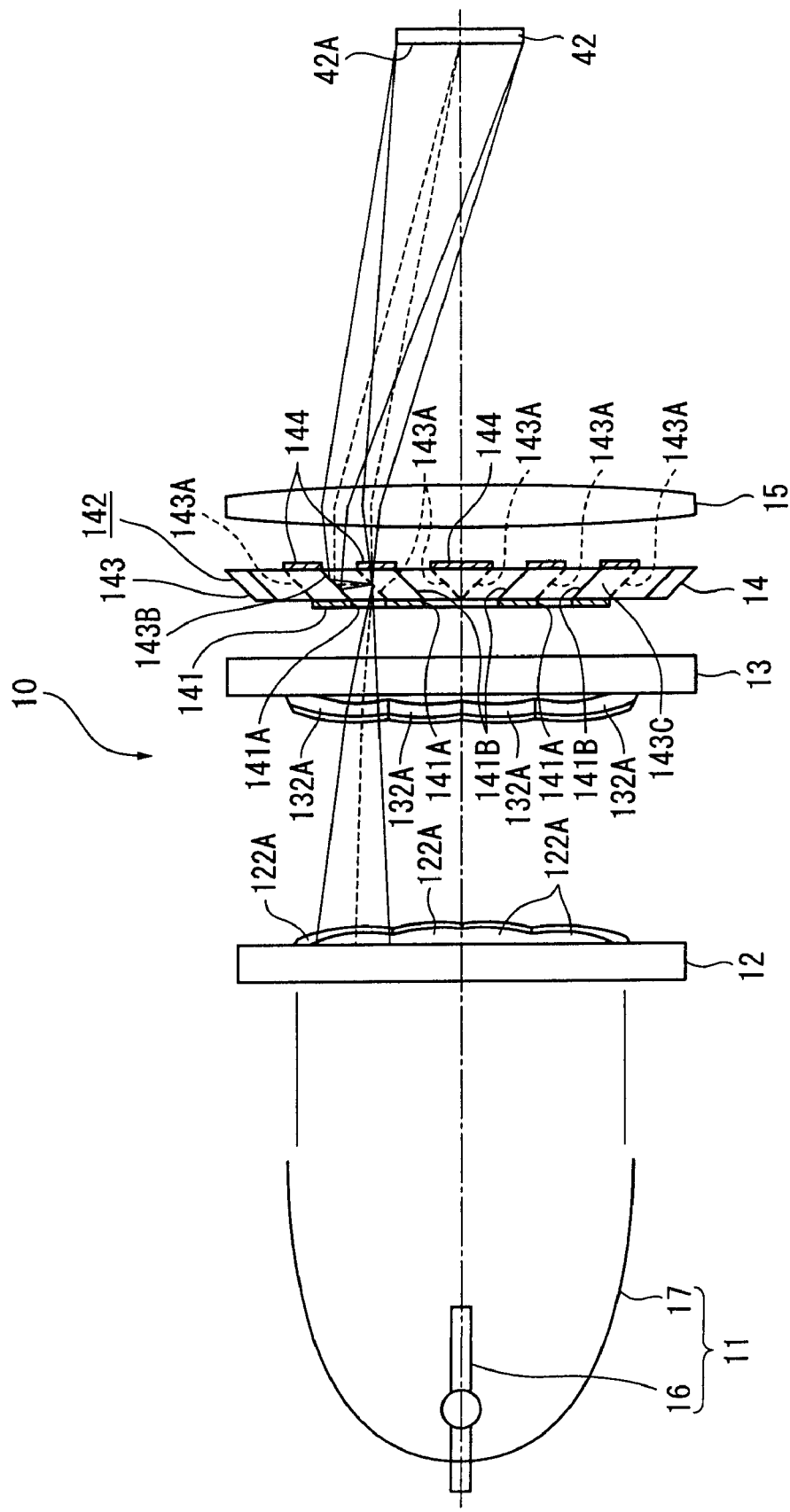

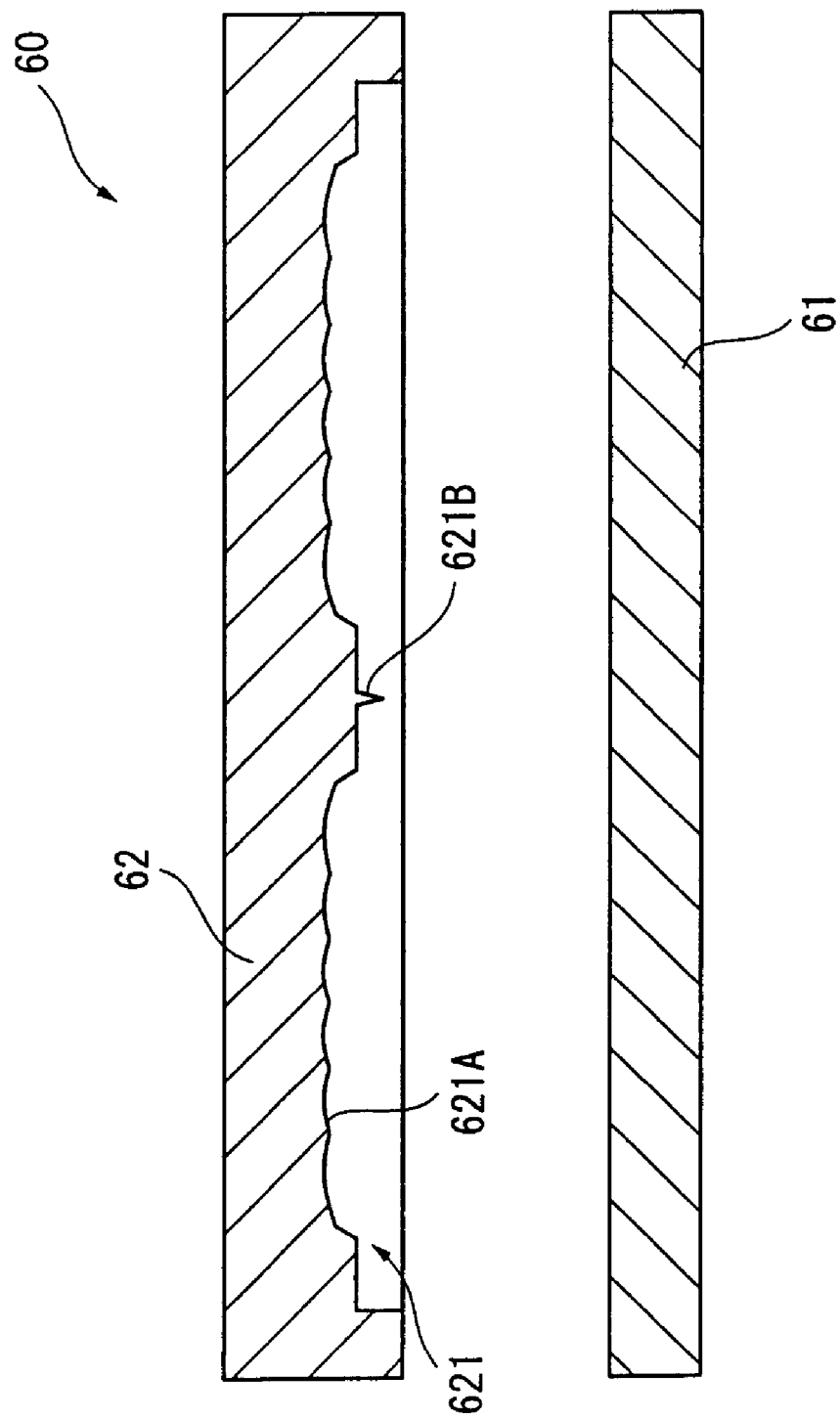

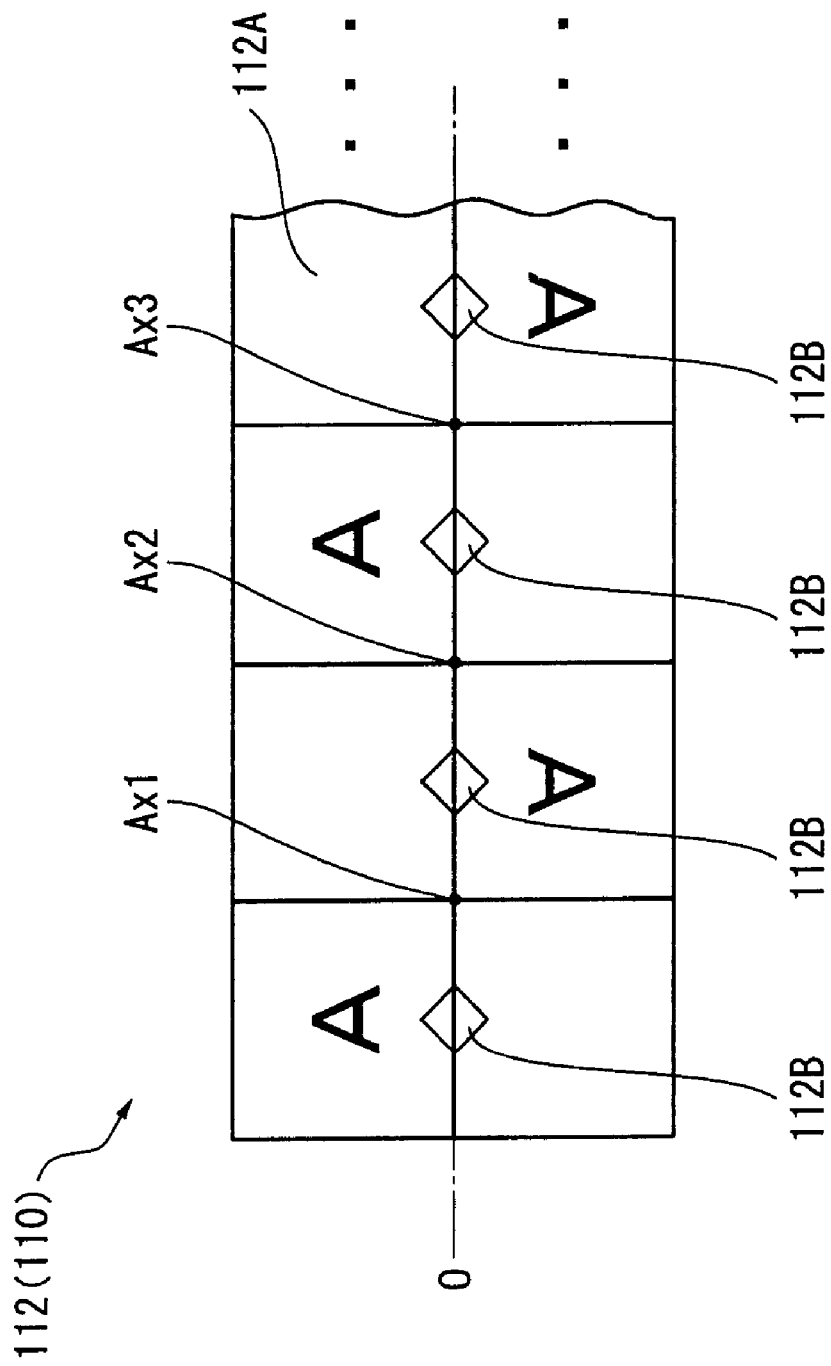

MANUFACTURING METHOD OF LENS ARRAY

CROSS-REFERENCE TO RELATED APPLICATION

This is a Division of application Ser. No. 10/882,288 filed Jul. 2, 2004. The disclosure of the prior application is incorporated by reference herein in its entirety.

BACKGROUND OF THE INVENTION

1. Field of the Invention

The present invention relates to a lens array manufactured by press-molding an molten optical material, a manufacturing method of the lens array, an illuminating optical system and a projector.

2. Description of Related Art

In a typical projector, a light irradiated from an illumination optical device is modulated by an optical modulator according to image information, and then a projection optical device projects the modulated light on a screen in an enlarged manner to display an image.

The illumination optical device is typically provided with a light source, a first lens array, a second lens array, and a superposing lens. A light beam irradiated by the light source is split into a plurality of sub-beams by a plurality of small lenses provided in the first lens array. The plurality of sub-beams pass though the second lens array having a plurality of small lenses corresponding to the plurality of small lenses of the first lens array, and then the sub-beams are superposed on an image formation area of the optical modulator by the superposing lens. With use of such illumination optical device, the intensity of the light irradiating the optical modulator can be uniformly distributed.

As a lens array provided in this type of illumination optical device, a lens array having a highly accurate lens face is disclosed (e.g. Japanese Patent Laid-Open Publication No. 2002-328203).

This lens array includes a base and a dome-shaped lens section that is formed on the base and provided with a plurality of small lenses arranged in a matrix form. In the lens section, lateral faces of outermost small lenses arranged on the outermost periphery thereof are slanted toward the outer edge of the base so as to be angled with respect to one surface of the base.

For manufacturing this type of lens array, a molten optical material is pressed with use of a molding die having a die corresponding to the above lens array. Then, an excess portion formed by the press-working is cut off and thus the lens array is manufactured. During this process, since the molding die has a slant face corresponding to a slant face defining a lateral face of the small lenses, the molten optical material is spread along the slant face when press-molded therein, and the mold face of the molding die is finely copied on the molten optical material. Thus the manufactured lens array has a high-precision lens face.

However, according to the invention disclosed in the above publication, in the production process of the lens array, the excess portion formed by the press-working is cut off, and undesirably the lateral face of the lens array becomes rough because of this cutting. Therefore, if the lens array is held by a holder frame or the like while referring to the lateral face of the lens array as an external position reference face, the lateral face of the lens array should be accurately shaped after cutting the excess portion.

To avoid such troublesome shaping process, the above-mentioned publication discloses a lens array having a press-working face on a part of a cutting face, where the excess portion is cut off. However, manufacturing such lens array requires a molding die with a complex shape as well as a high production accuracy, and thus the production cost of the lens array is increased.

Moreover, according to the invention disclosed in the above publication, the lens array is produced one by one using a molding die in which only one die corresponding to the lens array is formed. Therefore, in the case of manufacturing a plurality of lens arrays, the above invention is disadvantageous in view of the production cost and time.

SUMMARY OF THE INVENTION

An object of the present invention is to provide a mass-producible lens array allowing cost reduction with fewer production steps, a manufacturing method of the lens array, an illumination optical device, and a projector.

According to an aspect of the present invention, a lens array manufactured by press-molding a molten optical material in a molding die having a plurality of dies corresponding to the lens array, includes: a base with a shape of substantially rectangular plate; and a dome-shaped lens section formed on one face of the base and having a plurality of small lenses, and at least one lateral face out of four lateral faces of the base is a bend-separation face separated by a bend-separation.

According to the above-described present invention, the molding die has a plurality of dies corresponding to the lens arrays, and at least one lateral face of the base of the lens array is the bend-separation face. With this configuration, by press-molding the molten optical material with use of the molding die and separating the molded article at the bend-separation face, a plurality of lens arrays can be easily produced from the one molding die. This allows the mass-production of the lens array as well as the cost reduction of the lens array.

For holding the lens array by a holder frame or the like with its position being determined, at least one lateral face out of the four lateral faces of the base on the lens array is formed as a press-working face molded by the molding die so that the press-working face is held as an external position reference face by a holder frame or the like.

In the present invention, at least one lateral face out of the four lateral faces of the base of the lens array is defined as the bend-separation face. Accordingly, the lateral faces excluding the bend-separation face may be formed as the press-working face and this press-working face may be used as the external position reference face. This eliminates the need for precisely shaping the bent and separated lateral face as conventionally done, thereby simplifying the manufacturing process of the lens array while reducing the cost of the lens array.

With the lens array having the above-described shape, since the shape of the molding die is not complicated, the increase of the production cost of the lens array accompanied with that of the production cost of the molding die is evitable.

Preferably, in the above-described lens array of the present invention, the lens section has an optically operative lens area and a dummy area extended from the lens area toward the outer side of the lens array, and the dummy area is formed at least on outermost small lenses that are press-molded at the outer periphery of the molding die when press-molded in the molding die.

Herein, the outermost small lenses indicate the small lenses molded at a section along the outer periphery of the die formed in the molding die.

The dummy area may be formed at least on the outermost small lenses, or may be formed on all the small lenses arranged at the periphery out of the plurality of small lenses of the lens section.

According to the present invention, the lens section has the dummy area in addition to the lens area. With this configuration, even when a drop is formed on the outer periphery of the molding die during the press-molding of the lens array, the drop is formed on the dummy area and hence the accuracy of the lens area can be properly secured. This allows the reduction of the defective rate in the production of the lens array as well as the production cost reduction of the lens array.

Further, in the case that the dummy area is formed only on the outermost small lenses, the accuracy of the lens area of the plurality of the molded lens arrays can be properly secured with this minimum area.

In the above-described lens array of the present invention, it is preferable that the dummy area is an area extended from the lens area toward the outer side of the lens array in a range of 0.5 to 2.0 mm.

According to the present invention, the dummy area is the area extended from the lens area toward the outer side of the lens array in a range of 0.5 to 2.0 mm, which is the optimum range for the dummy area, so that the accuracy of the lens area can be properly secured.

In the case where the dummy area is an area extended from the lens area toward the outer side of the lens array in a range of less than 0.5 mm, if a drop is formed on the outer periphery of the molding die during the press-molding of the lens array, the drop is likely to affect the lens area.

In the case where the dummy area is an area extended from the lens area toward the outer side of the lens array in a range of over 2.0 mm, even if a drop is formed on the outer periphery of the molding die during the press-molding of the lens array, the accuracy of the lens area can be properly secured. However, since the dummy area is widened, the more molten optical material is needed, thus inhibiting the cost reduction of the lens array.

The lengths of the dummy area in the vertical and horizontal directions may be different. For example, in the case that the lengths from the outer edge of the base to the outer edge of the lens section in the vertical and horizontal directions are different, the volume of the drops formed at the outer edge sections during the molding of the lens array are different. For such case, it is desirable to set the lengths in the vertical and horizontal directions at different values depending on the volume of the drops.

Preferably, in the above-described lens array of the present invention, the lens section is formed in a substantially rectangular shape in plan view with four chamfered corners, and a peripheral edge of the lens section is a slant face that is slanted from the inner side of the lens section toward the outer side to be angled with respect to the one face of the base.

The shape of the slant face may be flat or may be curved.

According to the present invention, the lens section is formed in a substantially rectangular shape with four chamfered corners, and the peripheral edge of the lens section is a slant face. With this configuration, the mold face of the molding die can be finely copied on the molten optical material during the press-molding of the lens array, allowing the accurate production of the lens array.

Further, having such configuration, it is easy to remove the lens array from the molding die after molding the lens array.

In the above-described lens array of the present invention, the plurality of small lenses of the lens section are preferably connected with little height difference at a connected part of each other.

Herein, "being connected with little height difference at a connected part of each other" indicates, to be more specific, a state so optimized to have a height difference between adjacent small lenses as close to 0 as possible in the entire lens array, or, to minimize an average value of the height differences.

According to the present invention, the plurality of small lenses of the lens section are connected with little height difference at the connected part of each other. With this configuration, as compared with case of the small lenses having the height difference at the their connected part, the mold face of the molding die can be finely copied on the molten optical material during the press-molding of the lens array, allowing further accurate production of the lens array.

Also, having such configuration, it is further facilitated to remove the lens array from the molding die after molding the lens array.

In the above-described lens array of the present invention, it is preferable that the base has a flat section where the thickness of the base is equal, the flat section surrounding an area where the plurality of small lenses are formed, and it is also preferable that a step projected or recessed from the flat section is formed at a position on an end face as the bend-separation face.

According to the present invention, since the step is formed on the flat section of the base, the step can be used as a position determining part when the lens array is held by the holder frame or the like. For example, even when only one lateral face out of four lateral faces of the base is the press-working face as the external position reference surface, the lateral face opposite to the press-working face is defined as the bend-separation face, so that the lens array can be positioned referring to the step formed on the bend-separation face and the press-working face. Thus, the lens array can be properly held by the holder frame or the like.

According to another aspect of the present invention, disclosed is a method for manufacturing a lens array including a base with a shape of substantially rectangular plate, and a dome-shaped lens section formed on one face of the base and having a plurality of small lenses, the method including: a press-molding step for setting and press-molding a molten optical material in a molding die in which a plurality of dies corresponding to the lens array are formed; and a bending and separating step for removing from the molding die after the molding, and separating adjacent lens array molded articles by bending at a boundary thereof.

According to the present invention, the molding die has a plurality of dies corresponding to the lens arrays, and the manufacturing method of the lens array includes the press-molding step and the bending and separating step. Accordingly, since the molten optical material is press-molded in the press-molding step and a lens molded article is separated into a plurality of lens arrays in the bending and separating step, a plurality of lens arrays can be easily produced from one molding die. This allows the mass-production of the lens array as well as the cost reduction of the lens array.

For instance, at least one lateral face out of the four lateral faces of the base of the lens array is defined as the bend-separation face separated in the bending and separation step, and the other lateral faces are defined as the press-working faces molded by the molding die in the press-molding step.

When the lens array is manufactured with this configuration, the press-working face is used as the external position reference face. This eliminates the need for precisely shaping the bent and separated lateral face as conventionally done, thereby simplifying the manufacturing process of the lens array while reducing the cost of the lens array.

Also, when the lens array is manufactured with this configuration, since the shape of the molding die is not complicated, the increase of the production cost of the lens array accompanied with that of the production cost of the molding die is evitable.

According to the manufacturing method of the lens array of the present invention, it is preferable that dies corresponding to a plurality of types of lens array different in the optical function are formed in the molding die.

With this arrangement, since the dies corresponding to the plurality of types of lens array different in the optical function are formed in the molding die, for example, a first lens array and a second lens array different in the optical function can be molded by one molding die at a time.

In the above-described manufacturing method of the lens array, it is preferable that the dies corresponding to 2×(1+n) sets of the lens array are formed in the molding die, and the dies are arranged in a matrix form of 2 rows×(1+n) columns, where n represents a natural number including zero.

According to the present invention, the dies are arranged in the matrix form of 2 rows×(1+n) columns as described above. Accordingly, by molding the lens array in this molding die, the lens array having at least one bend-separation face can be manufactured. Therefore, since the lateral face excluding the bend-separation faces is formed as the press-working face, the lens array can be positioned referring to the press-working face as the external position reference face and properly held by the holder frame or the like.

In the above-described manufacturing method of the lens array, it is preferable that the dies arranged in the matrix form of 2 rows×(1+n) columns are symmetric with respect to a plane passing a boundary line of each row.

Further, in the manufacturing method of the lens array according to the present invention, it is preferable that at least four dies corresponding to the lens array are formed, and four adjacent dies in said dies are symmetric about an axis passing a cross point of boundary lines of the respective dies, under a 180 degree rotation.

According to the manufacturing method of the lens array of the present invention, it is preferable that two dies corresponding to the lens array are formed in the molding die, and the dies are symmetric about a rotation axis under a 180-degree rotation, the rotation axis passing the center of a boundary line of each row.

In the above cases that the dies are symmetric with respect to a plane passing a boundary line or about a specific rotation axis, the pressure applied to the molten optical material during the press-working is easily uniformed, and consequently the accuracy of the lens can be improved. Also, by arranging the respective dies to be symmetric, the lens arrays can be positioned in the same direction when the lens arrays are fixed in the holder frame or the like.

According to a further aspect of the present invention, an illumination optical device includes: a light source; a first lens array for splitting a light beam irradiated from the light source into a plurality of sub-beams; and a second lens array for focusing the sub-beams on an illuminated area, the illumination optical device superposing the sub-beams on the illuminated area, and the first lens array and the second lens array are the lens array descried above.

According to the present invention, since the illumination optical device includes the light source, the first lens array, and the second lens array, and the first lens array and/or the second lens array is the above-described lens array, the same effects and advantages of the above lens array can be obtained.

Also, since the illumination optical device includes the low-cost lens array, the cost of the illumination optical device can be reduced.

According to a still further aspect of the present invention, a projector includes: the above-described illumination optical device; an optical modulator for modulating a light beam irradiated from the illumination optical device in accordance with image information to form an optical image; and a projection optical device for projecting the optical image in an enlarged manner.

According to the present invention, since the projector has the above-described illumination optical device, the optical modulator and the projection optical device, the same functions and advantages as the above-described illumination optical device can be obtained.

Also, since the projector includes the low-cost illumination optical device, the cost of the projector can be reduced.

BRIEF DESCRIPTION OF THE DRAWINGS

FIG. 1 is a schematic illustration showing an optical system of a projector according to a present embodiment;

FIG. 2 is a schematic illustration showing a structure of an integrator illuminating optical system according to the aforesaid embodiment;

FIG. 5 is a cross-section showing a structure of a molding die according to a first embodiment;

FIG. 15 is an illustration showing another modification of the aforesaid embodiments.

DETAILED DESCRIPTION OF PREFERRED EMBODIMENT(S)

First Embodiment

Figure 3A:
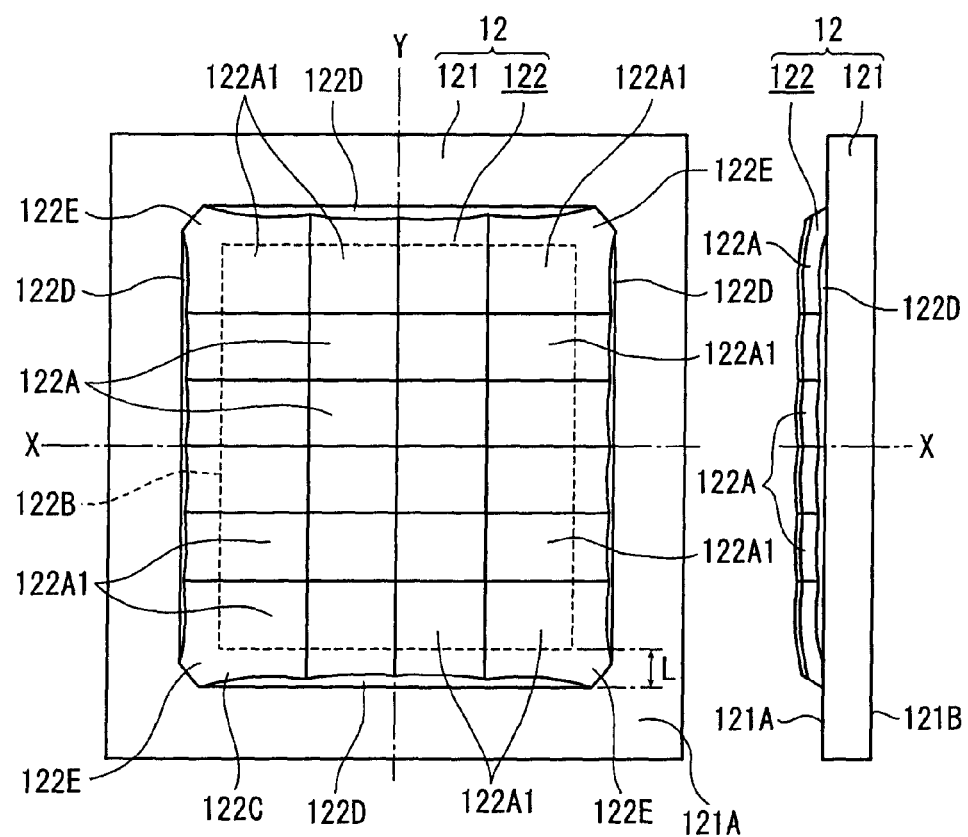
FIGS. 3A to 3C are illustrations each showing a structure of a first lens array according to the aforesaid embodiment.

A first embodiment of the present invention will be described below with reference to the attached drawings.
[Structure of Projector]
FIG. 1 is a schematic illustration showing an optical system of a projector 1 according to the present embodiment.

The projector 1 modulates a light beam irradiated from a light source in accordance with image information to form an optical image, and projects it on a screen in an enlarged manner. The projector 1, as shown in FIG. 1, has an integrator illuminating optical system 10 as an illumination optical device, a color-separating optical system 20, a relay optical system 30, an optical device 40, and a projection lens 50 as a projection optical device. These optical components 10 to 50 are installed on a predetermined illumination optical axis A according to a light guide 2 as a casing.

The interrogator illuminating optical system 10 splits an illumination light into a plurality of sub-beams and converts the plurality of sub-beams into a substantially uniform polarized light beam to irradiate them to substantially uniformly illuminate image formation areas of three liquid crystal panels 42 (referred to as liquid crystal panels 42R, 42G and 42B for each color light of red, green and blue) of the optical device 40.

The detailed structure of the integrator illuminating optical system 10 will be described later.

The color-separating optical system 20 has two dichroic mirrors 21 and 22, and a reflection mirror 23, and serves to separate the plurality of sub-beams irradiated by the integrator illuminating optical system 10 by the dichroic mirrors 21 and 22 into three color lights of red (R), green (G) and blue (B).

The relay optical system 30 has an incident-side lens 31, a relay lens 33 and two reflection mirrors 32 and 34, the relay optical system 30 serving to guide the color light (red light) separated by the color-separating optical system 20 to the liquid crystal panel 42R.

The dichroic mirror 21 of the color-separating optical system 20 transmits a red light component and a green light component of the light beam irradiated from the integrator illuminating optical system 10 and reflects a blue light component. The blue light reflected by the dichroic mirror 21 is reflected again by the reflection mirror 23. Then it passes through a field lens 18 and reaches the liquid crystal panel 42B for blue color. The field lens 18 converts the respective sub-beams irradiated by the integrator illuminating optical system 10 into a light beam parallel to the central axis (main beam) thereof. The field lenses 18 provided on the light-incident side of the other liquid crystal panels 42G and 42R function in the same manner.

In the red and green lights passed through the dichroic mirror 21, the green light is reflected by the dichroic mirror 22. Then the green light passes through the field lens 18 to reach the liquid crystal panel 42G for green light. In the meantime, the red light passes through the dichroic mirror 22 and the relay optical system 30, and then passes thorough the field lens 18 to reach the liquid crystal panel 42R for red light.

Herein, in view of the fact that the optical path length of the red light is longer than those of the other color lights, the relay optical system 30 is used for the red light to prevent deterioration in the light utilization efficiency due to the light dispersion and the like. In other words, the relay optical system 30 is used for directly transmitting the sub-beams incident on the incident-side lens 31 to the field lens 18. Although the red light out of the three color lights passes through the relay optical system 30, the blue light, for instance, may alternatively pass through the relay optical system 30.

The optical device 40 modulates the incident light beam in accordance with image information to form a color image. As shown in FIG. 1, the optical device 40 has three incident-side polarization plates 41 on which the respective color lights separated by the color-separating optical system 20 are incident, the liquid crystal panels 42 (42R, 42G and 42B) as an optical modulator disposed on the downstream of the respective incident-side polarization plates 41, and irradiation-side polarization plates 43 disposed on the downstream of the respective liquid crystal panels 42, and a cross dichroic prism 44.

The liquid crystal panel 42, which is a pair of transparent glass substrates with liquid crystal (electric optical material) sealed therebetween, uses a switching element such as a polycrystalline silicon TFT to modulate the polarization direction of the polarized light beam irradiated from the incident-side polarization plate 41 in accordance with a received image signal. The liquid crystal panels 42R, 42G and 42B each include an image formation area for performing the modulation, which has a rectangular shape with a diagonal length of 0.7 inch.

The incident-side polarization plate 41 only transmits a light polarized in a predetermined direction out of the respective color lights separated by the color-separating optical system 20 while absorbing the other light beams. This incident-side polarization plate 41 is a substrate made of sapphire glass and the like with a polarization film attached thereon. Instead of using the substrate, a polarization film may be attached on the field lens 18.

The irradiation-side polarization plate 43, which is configured substantially in the same manner as the incident-side polarization plate 41, only transmits a light polarized in a predetermined direction out of the light beams irradiated by the liquid crystal panels 42 (42R, 42G and 42B) while absorbing the other light beams. Instead of using the substrate, a polarization film may be attached on the cross dichroic prism 44.

The incident-side polarization plate 41 and the irradiation-side polarization plate 43 are arranged so that the directions of the polarization axes thereof are orthogonal with each other.

The respective color lights separated by the color-separating optical system 20 are modulated by the three liquid crystal panels 42 (42R, 42G and 42B), the incident-side polarization plates 41 and the irradiation-side polarization plates 43 in accordance with image information to form an optical image.

The cross dichroic prism 44 combines the optical image irradiated by the irradiation-side polarization plate 43 and modulated for each color light to form a color image. In the cross dichroic prism 44, a dielectric multi-layer film for reflecting the red light and a dielectric multi-layer film for reflecting the blue light are formed along the boundaries of four right-angle prisms approximately in X-shape, the dielectric multi-layer films combining the three color lights.

The projection lens 50 projects the color image formed by the optical device 40 on a screen in an enlarged manner. The projection lens 50, which is a lens set including a plurality of lenses housed in a cylindrical lens barrel, can change the relative position of the plurality of lenses so as to adjust focus and magnification of the projected image.

[Structure of Integrator Illumination Optical System]

FIG. 2 is a schematic illustration showing a structure of the integrator illuminating optical system 10.

As shown in FIG. 2, the integrator illuminating optical system 10 has a light source device 11, a first lens array 12, a second lens array 13, a polarization converter 14 and a superposing lens 15.

In the light source device 11 having a light source lamp 16 and a reflector 17, a radial light beam irradiated from the light source lamp 16 is reflected by the reflector 17 to be a substantially parallel light beam, and this parallel light beam is irradiated to the outside. A high-pressure mercury lamp is used as the light source lamp 16. Instead of the high-pressure mercury lamp, a metal halide lamp or a halogen lamp may be applicable as the light source lamp 16. A parabolic mirror is used for the reflector 17. Instead of the parabolic mirror, a combination of a parallelizing concave lens and an ellipsoidal mirror may be used for the reflector 17.

The first lens array 12 is a multi-lens array consisting of small lenses 122A arranged in a matrix form, the lenses having substantially rectangular shape when viewed from the optical axis direction. The respective small lenses 122A, as shown in FIG. 2, separate the light beam irradiated by the light source lamp 16 into a plurality of sub-beams.

The detailed structure of the first lens array 12 will be described later.

The second lens array 13, which is configured substantially in the same manner as the first lens array 12, is a multi-lens array consisting of small lenses 132A arranged in a matrix form. As shown in FIG. 2, the second lens array 13 together with the superposing lens 15 focus the image of the small lenses 122A of the first lens array 12 onto the image formation area 42A of the liquid crystal panel 42.

The detailed structure of the second lens array 13 will be described later.

The polarization converter 14, which is arranged between the second lens array 13 and the superposing lens 15, converts the light from the second lens array 13 into a substantially uniform polarized light. This contributes to improve the light utilization efficiency at the optical device 40. Specifically, the polarization converter 14 has a light-shielding mask 141 and a polarization-converting element body 142 as shown in FIG. 2.

The light-shielding mask 141 on the light-incident side of the polarization-converting element body 142 is a plate member having a plurality of openings 141A formed in a band-like arrangement corresponding to the small lenses 132A of the second lens array 13 as shown in FIG. 2. The light-shielding mask 141 shields a light beam generating an ineffective polarized light included in the light beam irradiated from the second lens array 13, or shields the light beam incident on a below-described reflection film 143B of the polarization-converting element body 142.

The polarization-converting element body 142 converts the incident light beam having various randomly polarized lights into a uniform linearly-polarized light and irradiates it. Referring to FIG. 2, the polarization-converting element body 142 includes a polarization-converting element array 143 having a plurality of polarization-separating films 143A oblique to the incident light beam, reflection films 143B arranged in parallel between each polarization-separating film 143A, and glass sheets 143C interposed between the polarization-separating films 143A and the reflection films 143B, and a retardation film 144 disposed on the light-irradiation side of the polarization-converting element array 143 so as to shift the phase of the incident light beam by π.

When a plurality of sub-beams irradiated from the second lens array 13 are incident on the polarization converter 14, the light-shielding mask 141 shields the light beam generating ineffective polarized light. Then the polarization-separating film 143A of the polarization-converting element array 143 separates the effective light beams into a polarized light P and a polarized light S. Specifically, the polarized light P passes through the polarization-separating film 143A, while the polarized light S is reflected by the polarization-separating film 143A so that the optical path thereof is deflected by approximately 90 degrees. The polarized light S reflected by the polarization-separating film 143A is reflected by the reflection film 143B so that the optical path thereof is deflected by approximately 90 degrees again. Thus, the polarized light S travels in the direction substantially same as the incident direction toward the polarization converter 14. Meanwhile, the polarized light P passed through the polarization-separating film 143A is incident on the retardation film 144 and irradiated as the polarized light S with the phase shifted by π. With this configuration, the light beam irradiated from the polarization converter 14 is converted into a substantially uniform polarized light S.

The superposing lens 15 is an optical element that condenses the plurality of sub-beams passed through the first lens array 12, the second lens array 13 and the polarization converter 14 to superpose them on the image formation areas 42A of the liquid crystal panels 42 (42R, 42G and 42B). The light beam from the superposing lens 15 is irradiated to the color-separating optical system 20.

[Structure of First Lens Array 12]

Figure 3B:
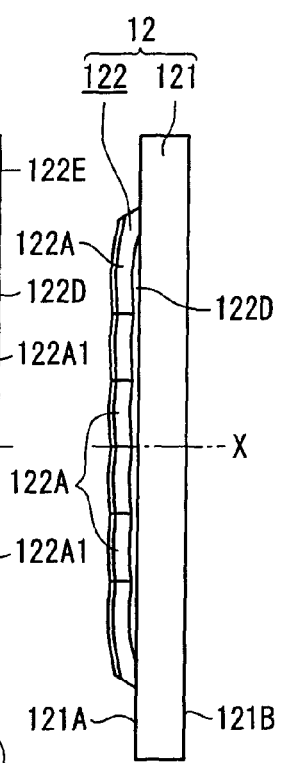
Figure 3C:
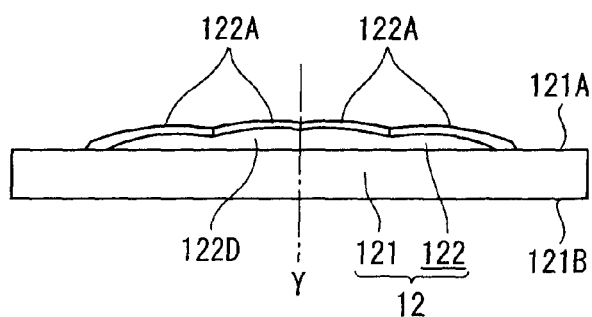

FIGS. 3A to 3C are illustrations each showing a structure of the first lens array 12. Specifically, FIG. 3A is an illustration showing the front side of the first lens array 12. FIG. 3B is a side elevational view of the first lens array 12. FIG. 3C is an illustration showing the upper side of the first lens array 12.

The first lens array 12 is a mold product manufactured by press-molding a chunk of molten glass (so-called "gob") as a molten optical material in a below-described molding die. As shown in FIGS. 3A to 3C, the first lens array 12 has a base 121 and a lens section 122.

The base 121 is a substantially rectangular plate, one side of which is a lens face 121A having a lens section 122 thereon, and the other side of which is a substantially flat non-lens face 121B. Since a plurality of such first lens arrays 12 are produced at a time by the below-described molding die as will be explained later in detail, at least one lateral face out of four lateral faces of the base 121 is a bend-separation face to be separated from other first lens arrays 12.

The lens section 122, which is dome-shaped and formed at a substantial center part of the lens face 121A of the base 121, includes the plurality of small lenses 122A dividing the light beam irradiated by the light source device 11 into the plurality of sub-beams.

Theses plurality of small lenses 122A are arranged in a matrix form (of 6 rows×4 columns, wherein the row representing elements horizontally arranged in a line, and the column representing elements vertically arranged in a line) on the lens face 121A. As shown in FIGS. 3B and 3C, each small lens 122A has an arcuate cross-section, and is connected with little height difference at the connected part of each other. To be more specific, it is so optimized to have a height difference between adjacent small lenses 122A as close to 0 as possible in the entire lens array, or, to minimize an average value of the height differences.

In this lens section 122, as shown in FIG. 3B the small lenses 122A vertically arranged in a line are so formed that the respective peak points most distant from the base 121 have the same height with each other. On the other hand, as shown in FIG. 3C, the small lenses 122A in the two inner columns out of four columns are higher than the small lenses 122A in the two columns on both sides, forming an arcuate shape altogether.

In the lens section 122, the rectangular area (shown by a dotted line in FIG. 3A) at the substantial center part is a lens area 122B for optically processing the incident light beam while the area extended from the lens area 122B toward the outer side of the lens section 122 is defined as a dummy area 122C with no light beam irradiated thereon. In other words, the dummy area 122C is formed at the periphery of the sixteen pieces of outermost small lenses 122A1 arranged on the outermost periphery out of the plurality of the small lenses 122A constituting the lens section 122. The dummy area 122C preferably has a length L (in plan view) within a range of 0.5 to 2.0 mm.

Although all the lengths L in the vertical and horizontal directions are the same in the present embodiment, they may be different. For example, in the case that the lengths from the outer edge of the base to the outer edge of the lens section in the vertical and horizontal directions are different, the volume of the drops formed at the outer edge sections during the molding of the lens array are different. For such case, it is desirable to set the lengths in the vertical and horizontal directions at different values depending on the volume of the drops.

In the lens section 122, the outer edges of the dummy area 122C, or the lateral faces of the outermost small lenses 122A1 not in adjacent to the other small lenses 122A are formed as slant faces 122D slanted toward the inner side of the lens section 122 relative to a plane orthogonal to the lens face 121A of the base 121. Having the slant faces 122D, the height of the lens section 122 bulged from the lens face 121A of the base 121 is gradually increased from the boundary line with the base 121 toward the inner side.

The slant face 122D may have either a flat surface or a curved surface.

In each four outermost small lenses 122A1 at the four corners of the lens section 122, a corner portion not in contact with the other small lenses 122A is a chamfer 122E with its edge cut off (FIG. 3A). Having the chamfer 122E, at the four corner of the lens section 122 just like the above slant face 122D, the height bulged from the lens face 121A of the base 121 is gradually increased from the boundary line with the base 121 toward the inner side.

The lens section 122 with the above-described form is symmetric with respect to a plane X and a plane Y shown in FIGS. 3A to 3C.

[Structure of Second Lens Array 13]

Figures 4A, 4B:
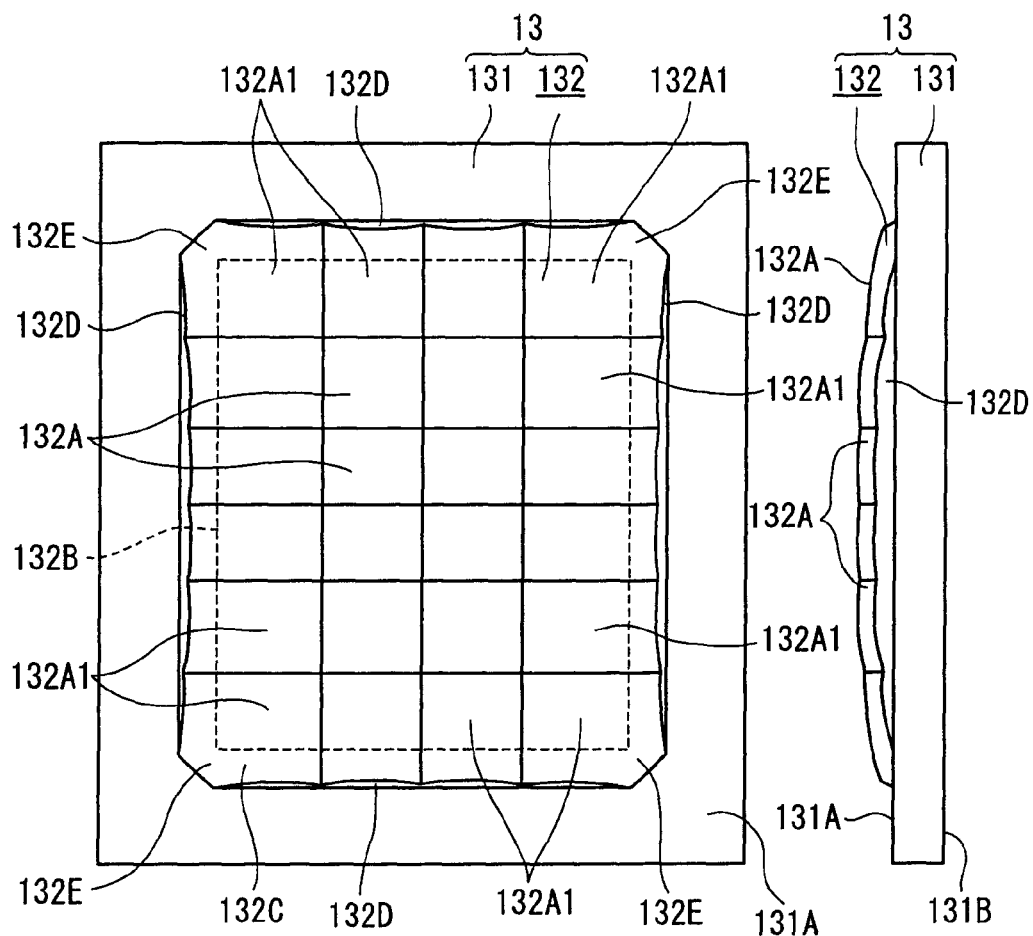
FIGS. 4A to 4C are illustrations each showing a structure of a second lens array according to the aforesaid embodiment.
Figure 4C:
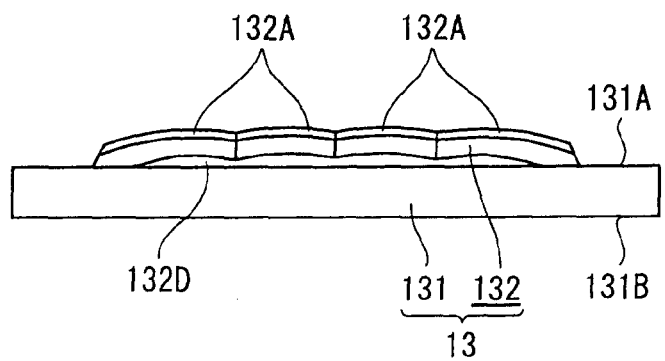

FIGS. 4A to 4C are illustrations each showing a structure of the second lens array 13. Specifically, FIG. 4A is an illustration showing the front side of the second lens array 13. FIG. 4B is a side elevational view of the second lens array 13. FIG. 4C is an illustration showing the upper side of the second lens array 13.

The second lens array 13, just like the first lens array 12, is a mold product manufactured by press-molding a chunk of molten glass as a molten optical material in the below-described molding die. As shown in FIGS. 4A to 4C, the second lens array 13, which has the structure substantially same as the first lens array 12, is provided with a base 131 and a lens section 132 respectively corresponding to the base 121 and the lens section 122 of the first lens array 12.

The base 131, which has the shape same as the base 121 of the first lens array 12, is provided with a lens face 131A and a non-lens face 131B. As in the case of the first lens array 12, since a plurality of second lens array 13 are produced at a time by the below-described molding die as will be explained later in detail, at least one lateral face out of four lateral faces of the base 131 is a bend-separation face to be separated from other first lens arrays 13.

The lens section 132, which also has the structure substantially same as the lens section 122 of the first lens array 12, is provided with small lenses 132A (including outermost small lenses 132A1), a lens area 132B, a dummy area 132C, slant faces 132D and chamfers 132E, respectively corresponding to the small lenses 122A (including the outermost small lenses 122A1), the lens area 122B, the dummy area 122C, the slant faces 122D and the chamfers 122E.

In this lens section 132, as shown in FIG. 4B, the small lenses 132A in the two innermost rows out of six rows of the lens section 132 are so formed that the respective peak points most distant from the base 131 are higher than the small lenses 132A in the other rows, and that the height gradually decreases toward the upper and lower rows, forming an arcuate shape altogether. As shown in FIG. 4C, the small lenses 132A horizontally arranged in a line are so formed that the respective peak points have the same height with each other.

[Structure of Molding Die for Manufacturing Lens Arrays 12, 13]

The following is a description, based on the drawings, of a molding die 60 used for press-molding the above first lens array 12 and the second lens array 13. The following description refers to the structure of the molding die 60 used for press-molding the first lens array 12. The substantially same structure is applied to the molding die 60 used for press-molding the second lens array 13.

FIG. 5 is a cross-section showing the structure of the molding die 60. Specifically, FIG. 5 is a cross-section showing the molding die 60 from the lateral side.

The molding die 60 is a molding die for procuring two first lens array 12 at a time, including a stationary die 61 and a movable die 62 advancable and retractable relative to the stationary die 61 as shown in FIG. 5. The stationary die 61 is fitted to the movable die 62 to form a cavity inside thereof, into which the molten optical material is sealed and thus two first lens arrays 12 are molded. Although not shown, a temperature control mechanism is provided inside the molding die 60 for cooling and curing the molten optical material sealed into the cavity.

The stationary die 61 is a substantially rectangular plate, the upper face of which serves as a mold face for forming the non-lens 121B face of the base 121 shared by the two first lens arrays 12.

The movable die 62 is a substantially rectangular plate having a recess 621 at its substantial center part (plan view).

The recess 621 has two dies corresponding to the shape of the first lens array 12, the inner face of which serves as a mold face 621A for forming the lens face 121A of the base 121 of the first lens array 12, three lateral faces out of four lateral faces of the base 121, and the lens section 122 of the first lens array 12.

Figure 6:
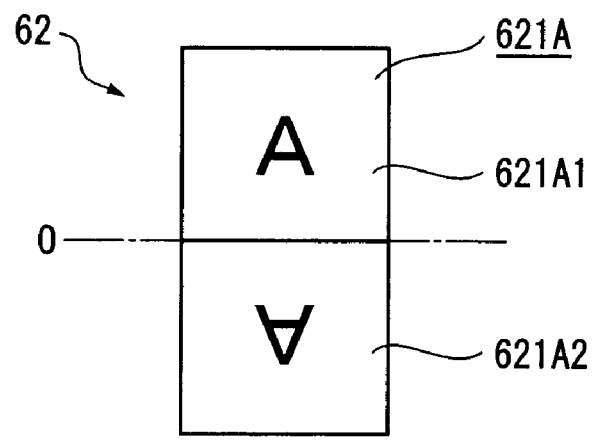
FIG. 6 is a schematic illustration showing a mold face of a movable die according to the aforesaid embodiment.

FIG. 6 is a schematic illustration showing the mold face 621A of the movable die 62. In FIG. 6, the die corresponding to the shape of the first lens array 12 is simplified and represented by a character "A" for the purpose of showing the horizontal and vertical directions of the two dies corresponding to the shape of the first lens array 12.

Referring to FIG. 6, the mold face 621A consists of two dies 621A1 and 621A2 corresponding to the shape of the first lens array 12.

These two dies 621A1 and 621A2 are arranged in a matrix form (of 2 rows×1 column) while arranged to be symmetric with respect to a plane O passing a boundary line of each row. Namely, the die 621A2 is vertically and horizontally reversed from the die 621A1.

The boundary part of the dies 621A1 and 621A2 has a projection 621B (FIG. 5). The projection 621B forms a below-described recess at the boundary part of the two first lens arrays 12 molded by the molding die 60 so as to allow the separation of the two first lens arrays 12 molded by the molding die 60. In other words, one lateral face of the base 121 of the first lens array 12 abutting on the projection 621B is a bend-separation face while the other three lateral faces of the base 121 of the first lens array 12 abutting on the four lateral faces of the mold face 621A shown in FIG. 6 are press-working faces.

Figure 7:
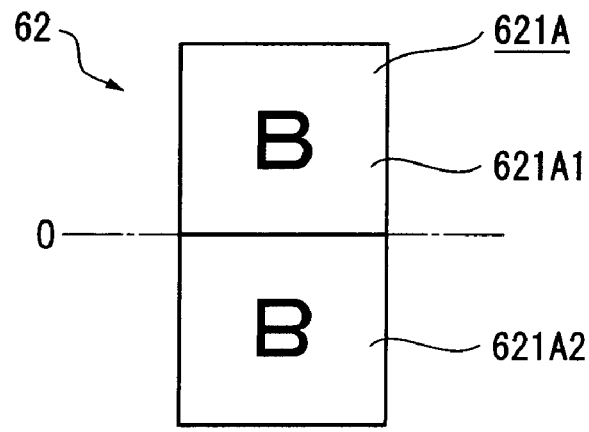
FIG. 7 is a schematic illustration showing the mold face of the movable die according to the aforesaid embodiment.

Although not explained, the structure of the molding die 60 for producing two second lens arrays 13 is substantially same as the structure explained above, the molding die 60 having a mold face 621A shown in FIG. 7. In FIG. 7, two dies corresponding to the shape of the second lens array 13 are represented by the character "B", just like the two dies corresponding to the shape of the above first lens array 12 are represented by the character "A".

[Manufacturing Method of Lens Arrays 12, 13]

Now, a method for manufacturing the first lens array 12 with use of the above molding die 60 will be described referring to the drawings. The same method will be applied to manufacture the second lens array 13.

Figure 8A:
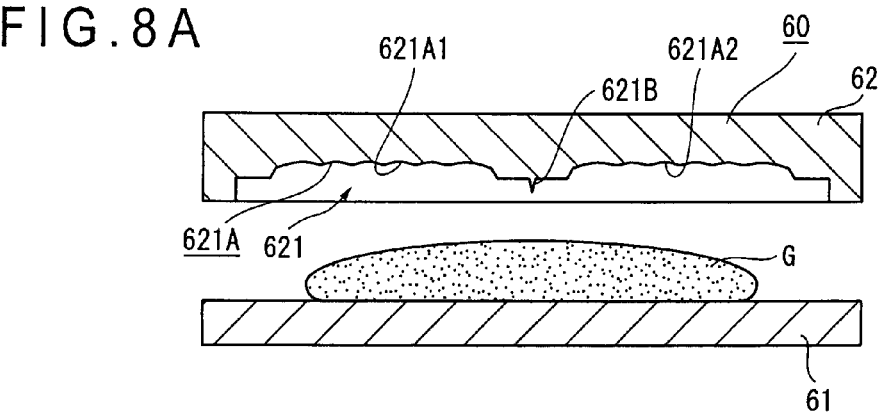
FIGS. 8A to 8C are illustrations showing steps for manufacturing the first lens array according to the aforesaid embodiment.
Figure 8B:
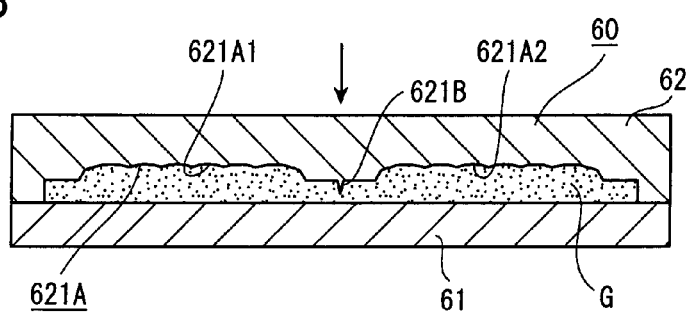
Figure 8C:
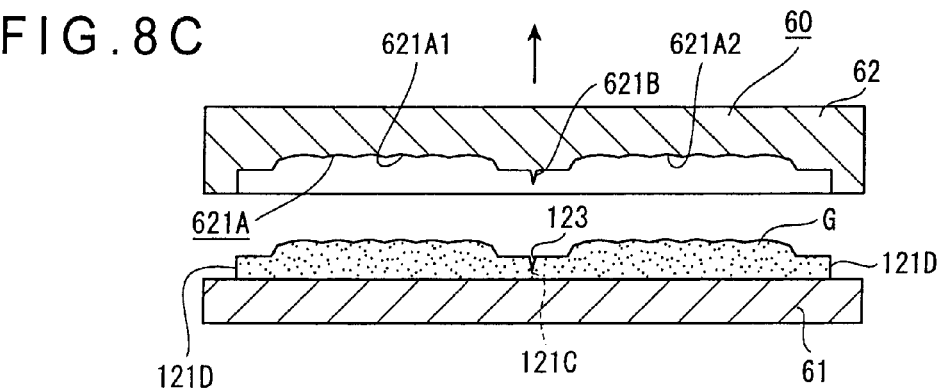

FIGS. 8A to 8C are illustrations showing steps for manufacturing the first lens array 12.

Firstly, with the stationary die 61 and the movable die 62 of the molding die 60 being opened, a molten glass G is placed on the upper face of the stationary die 61. The molten glass G is prepared by heating and melting a glass rod having a polished surface.

Then, as shown in FIG. 8B, the movable die 62 of the molding die 60 is moved toward the stationary die 61, and the stationary die 61 and the movable die 62 are pressed onto each other for conducting a press-working.

When the molten glass G is completely cooled and cured inside the cavity in the stationary die 61 and the movable die 62, the movable die 62 is moved away from the stationary die 61 as shown in FIG. 8C to remove the molten glass G from the molding die 60. To be more specific, the molten glass G is sticking to the movable die 62 upon the removal. Once the movable die 62 is cooled, the molten glass G as the lens array unsticks and free-falls from the die.

After that, the adjacent first lens arrays 12 are bent and separated at a recess 123 (FIG. 8C) formed by abutting on the projection 621B of the molding die 60. That is, the separated lateral face of the first lens array 12 is the bend-separation face 121C, and the other three lateral faces excluding the bend-separation face 121C are the press-working faces 121D.

With the steps described above, the first lens array 12 is manufactured.

The first lens array 12 manufactured by the above-described steps is held by a holder frame (not shown). Specifically, the first lens array 12 is positioned while referring to the three press-working faces 121D excluding the bend-separation face 121C as the external position reference faces, and then held by the holder frame (not shown). The first lens array 12 is set on a predetermined illumination optical axis A in the above-mentioned light guide 2 by the holder frame (not shown).

Advantages of First Embodiment

According to the above-described first embodiment, following advantages can be obtained.

(1) Two dies 621A1 and 621A2 corresponding to the shape of the first lens array 12 are formed in the molding die 60 for manufacturing the first lens array 12. One lateral face of the base 121 of the first lens array 12 molded by this molding die 60 is the bend-separation face 121C. Accordingly, by press-molding the molten glass G with use of the molding die 60 and separating the molded article at the bend-separation face 121C, two first lens arrays 12 can be easily produced by one molding die 60. This allows the mass-production of the first lens array 12 as well as the cost reduction of the first lens array 12. In addition, the second lens array 13 is also producible by the molding die 60 having the same structure, thereby allowing the mass-production of the second lens array 13 as well as the cost reduction of the second lens array 13.

(2) One out of four lateral faces of the base 121 of the first lens array 12 is the bend-separation face 121C. Other three lateral faces excluding the bend-separation face are the press-working faces 121D molded by the molding die 60. Accordingly, the first lens array 12 can be positioned while referring to the three press-working faces 121D as the external position reference faces, and held by the holder frame or the like. This eliminates the need for further precisely shaping the bent and separated lateral face as conventionally done, thereby simplifying the manufacturing process of the first lens array 12 while reducing the cost of the first lens array 12. The same applies to the second lens array 13.

(3) The first lens array 12 and the second lens array 13 have the above shape, which does not complicate the shape of the molding die 60, thereby avoiding the production cost increase of the first lens array 12 and the second lens array 13 accompanied with the production cost increase of the molding die 60.

(4) The lens sections 122 and 132 of the first lens array 12 and the second lens array 13 have the lens areas 122B and 132B and the dummy areas 122C and 132C. With this configuration, even when the material drops on the outer periphery of the molding die 60 during the press-molding of the first lens array 12 and the second lens array 13, the drop is formed on the dummy areas 122C and 132C and hence the accuracy of the lens areas 122B and the 132B are properly secured. Accordingly, the production defect rate of the first lens array 12 and the second lens array 13 is decreased, thus contributing to lowering the production cost of the first lens array 12 and the second lens array 13.

(5) The dummy areas 122C and 132C are extended from the lens areas 122B and 132B toward the outer side of the lens arrays 12 and 13 within the range of 0.5 to 2.0 mm, which are the optimum range for the dummy areas 122C and 132C, so that the accuracy of the lens areas 122B and 132B can be properly assured.

(6) The slant faces 122D and 132D and the chamfers 122E and 132E are formed at the outer edge of the lens sections 122 and 132 of the first lens array 12 and the second lens array 13. With this configuration, the mold face 621A of the molding die 60 can be finely copied on the molten optical material during the press-molding of the lens arrays 12 and 13, allowing the accurate production of the lens arrays 12 and 13. Further, having such configuration, the lens arrays 12 and 13 can be easily removed from the molding die 60 after molding the lens arrays 12 and 13.

(7) Each of the small lenses 122A and 132A of the lens sections 122 and 132 has the accurate cross-section while the adjacent small lenses 122A and the adjacent small lenses 132A are so connected to have approximately 0 height difference therebetween. With this configuration, as compared with case of the small lenses having the height difference at the their connected part, the mold face 621A of the molding die 60 can be finely copied on the molten glass G during the press-molding of the lens arrays 12 and 13, allowing further accurate production of the lens arrays 12 and 13. Also, such configuration further facilitates the removal of the lens arrays 12 and 13 from the molding die 60 after molding the lens arrays 12 and 13.

(8) The dies 621A1 and 621A2 are formed on the mold face 621A of the molding die 60. These dies 621A1 and the 621A2 are arranged in the matrix form of 2 rows×1 column while arranged to be symmetric with respect to the plane O passing the boundary line of each row. Accordingly, in the two first lens arrays 12 molded by this molding die 60, the bend-separation face 121C out of the four lateral faces of each base 121 can be formed on the lateral face at the lower side. In other words, in the two first lens arrays 12, the press-working faces 121D can be formed on the three lateral faces at the upper, left and right sides out of the four lateral faces of the each base. Therefore, when the first lens array 12 is held by the holder frame or the like, two first lens arrays 12 can be positioned in the same direction relative to each holder frame by referring to the press-working faces 121D formed on the three common lateral faces as the external position reference faces. The same applies to the second lens array 13.

(9) In the two first lens arrays 12 molded by the molding die 60, the three lateral faces out of the four lateral faces of the base 121 are the press-working faces 121D. Since these three lateral faces can be used as the external position reference faces, the first lens array 12 can be properly positioned by the holder frame or the like. The same applies to the second lens array 13.

(10) Since the integrator illuminating optical system 10 includes the above-described first lens array 12 and the second lens array 13, the cost of the integrator illuminating optical system 10 can be reduced.

(11) Since the projector 1 includes the above-described integrator illuminating optical system 10, the cost of the projector 1 can be also reduced.

Second Embodiment

A second embodiment of the present invention will be described below with reference to the attached drawings.

In the following description, the components same as those in the first embodiment are indicated by the same reference symbols or numerals for omitting or simplifying the detailed description thereof.

According to the first embodiment, two dies 621A1 and 621A2 corresponding to the shape of the first lens array 12 are formed on the mold face 621A of the movable die 62 of the molding die 60.

Meanwhile, according to the second embodiment, a die corresponding to the shape of the first lens array 12 and a die corresponding to the shape of the second lens array 13 are formed on a mold face 721A of a movable die 72 of a molding die 70. Other configurations are the same as the first embodiment.

Figure 9:
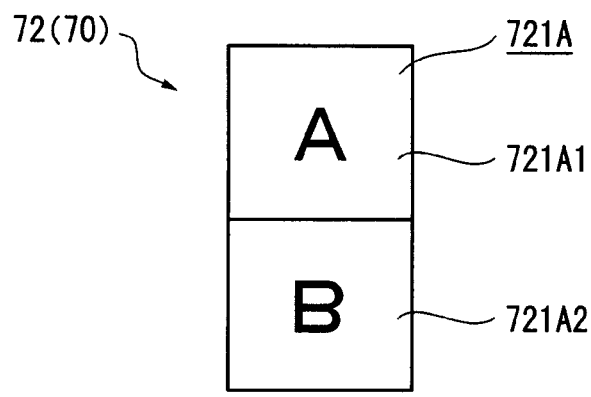
FIG. 9 is a schematic illustration showing a mold face of a movable die according to a second embodiment.

FIG. 9 is a schematic illustration showing the mold face 721A of the movable die 72 according to the second embodiment. The characters "A" and "B" shown in FIG. 9 have the same meaning as the characters "A" and "B" explained in FIGS. 6 and 7.

Referring to FIG. 9, the mold face 721A consists of a die 721A1 corresponding to the shape of the first lens array 12 and a die 721A2 corresponding to the shape of the second lens array 13.

These two dies 721A1 and 721A2 are arranged in a matrix form (of 2 rows×1 column) while one of them is vertically or horizontally reversed from the other one.

Although not shown, a projection same as the projection 621B described in the first embodiment is formed at the each boundary part of the dies 721A1 and 721A2. This projection forms a recess at the boundary of the two lens arrays 12 and 13 molded by the molding die 70 so that the two lens arrays 12 and 13 are separable at this recess by bending them. In other words, one lateral face of each of the bases 121 and 131 of the lens arrays 12 and 13 abutting on the projection is a bend-separation face.

The steps for manufacturing the lens arrays 12 and 13 with use of the molding die 70 and the steps for holding the manufactured lens arrays 12 and 13 with use of the holder frame (not shown) are the same as the first embodiment, and therefore the description thereof will be omitted.

Advantages of Second Embodiment

According to the above-described second embodiment, the following advantages can be obtained in addition to the advantages substantially same as the above (2) to (7) and (9) to (11).

(12) Two dies 721A1 corresponding to the shape of the first lens array 12 and 721A2 corresponding to the shape of the second lens array 13 are formed on the mold face 721A of the molding die 70. One lateral face of each of the bases 121 and 131 of the lens arrays 12 and 13 molded by this molding die 70 is the bend-separation face. Accordingly, by press-molding the molten glass G with use of the molding die 70 and separating the molded article at the bend-separation face, the first lens array 12 and the second lens array 13 are producible from the one molding die 70 at a time. This allows the mass-production of the first lens array 12 and the second lens array 13 as well as the cost reduction of the first lens array 12 and the second lens array 13.

(13) On the mold face 721A, the die 721A2 is vertically or horizontally reversed from the die 721A1. Accordingly, the lateral face at the lower side of the each of the bases 121 and 131 of the lens arrays 12 and 13 molded from the molded article can be the bend-separation face while the three lateral faces at the upper, left and right sides can be the press-working faces. Therefore, when the first lens array 12 and the second lens array 13 are held by the holder frame or the like, the first lens array 12 and the second lens array 13 can be positioned in the same direction relative to each holder frame by referring to the three press-working faces having three common vertical and horizontal directions as the external position reference faces. This facilitates the alignment of the optical axes of the first lens array 12 and the second lens array 13.

Third Embodiment

Next, a third embodiment of the present invention will be described below with reference to the attached drawings.

In the following description, the components same as those in the first embodiment are indicated by the same reference symbols or numerals for omitting or simplifying the detailed description thereof.

According to the first and second embodiments, two sets of the first lens array 12 and/or second lens array 13 are producible at a time by the molding dies 60 and 70.

Meanwhile, according to the third embodiment, six sets of first lens array 12 and/or second lens array 13 are producible at a time by a molding die 80. Other configurations are the same as the first embodiment.

Figure 10:
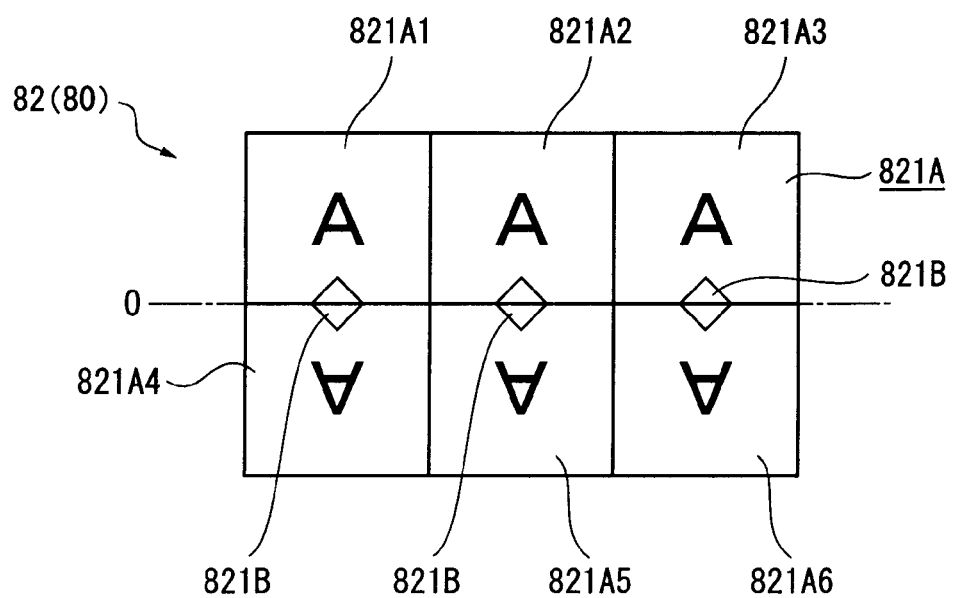
FIG. 10 is a schematic illustration showing a mold face of a movable die according to a third embodiment.

FIG. 10 is a schematic illustration showing a mold face 821A of the movable die 82 of the molding die 80 according to the third embodiment. In FIG. 10, the molding die 80 for producing six first lens arrays 12 at a time is shown. The character "A" shown in FIG. 10 has the same meaning as the character "A" explained in FIG. 6.

Referring to FIG. 10, the mold face 821A consists of six dies 821A1 to 821A6 corresponding to the shape of the first lens array 12.

These six dies 821A1 to 821A6 are arranged in a matrix form (of 2 rows×3 columns) while arranged to be symmetric with respect to a plane O passing a boundary line of each row. To be more specific, the dies 821A1 to 821A3 have the same vertical and horizontal directions while the dies 821A4 to 821A6 respectively have the vertical or horizontal direction reversed from that of the dies 821A1 to 821A3.

Although not shown, a projection same as the projection 621B described in the first embodiment is formed at the each boundary part of the dies 821A1 to 821A6. This projection forms a recess at the boundary part of the six first lens arrays 12 molded by the molding die 80 so that the six first lens arrays 12 are separable at this recess by bending them. In other words, the lateral face of the base 121 of the first lens array 12 abutting on the projection is a bend-separation face while other three lateral faces of the base 121 of the first lens array 12 abutting on the four lateral faces of the mold face 821A shown in FIG. 10 are press-working faces. In this embodiment, each base 121 of the first lens array 12 molded in the first and third columns of the mold face 821A has two bend-separation faces and two press-working faces, whereas each base 121 of the first lens array 12 molded in the second column at the center has three bend-separation faces and one press-working face.

A protrusion 821B as a step of rectangular shape (plan view) is formed at the boundary part of each row on the mold face 821A, or between the die 821A1 and the die 821A4, between the die 821A2 and the die 821A5, and between the die 821A3 and the die 821A6.

The steps for manufacturing the first lens array 12 with use of the molding die 80 are the same as the first embodiment, and therefore the description thereof will be omitted.

Figure 11A:
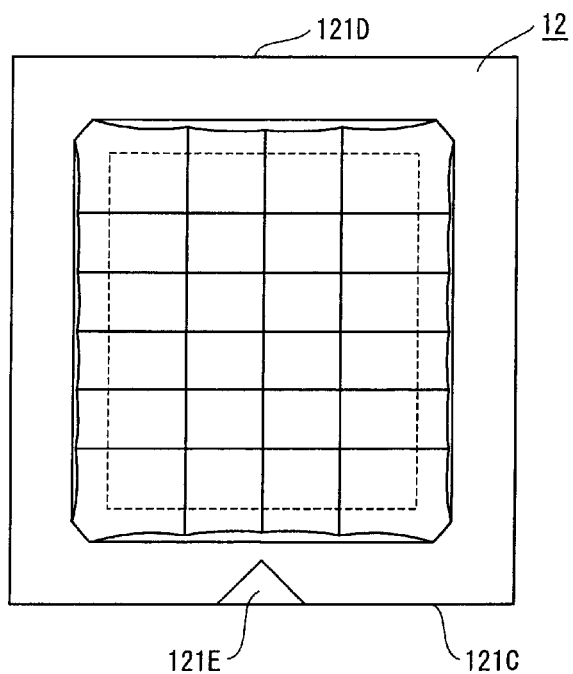
FIGS. 11A and 11B are illustrations each showing a first lens array manufactured with a molding die according to the aforesaid embodiment.
Figure 11B:
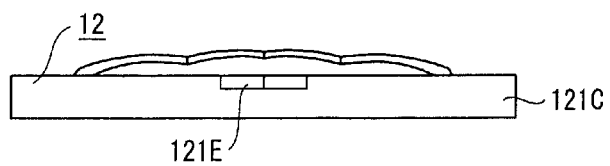

FIGS. 11A and 11B are illustrations each showing the first lens array 12 manufactured by the molding die 80. Specifically, FIG. 11A is an illustration showing a front side of the first lens array 12 and FIG. 11B is an illustration showing the lower side thereof. Out of the six first lens arrays 12 molded by the molding die 80, the first lens array 12 molded in the die 821A2 is shown in FIGS. 11A and 11B, having the lower lateral face of the base 121 as the bend-separation face 121C and the upper lateral face as the press-working face 121D.

As shown in FIGS. 11A and 11B, the first lens array 12 manufactured by the molding die 80 has a substantially triangular recess 121E along the bend-separation face 121C on the lens face 121A of the base 121, the recess 121E being formed by the protrusion 821B on the mold face 821A of the molding die 80.

The recess 121E along the bend-separation face 121C is chucked, and the first lens array 12 manufactured by the molding die 80 is positioned while referring to the press-working face 121D opposite to the bend-separation face 121C as the external position reference face and thus held by the holder frame (not shown). In this way, the first lens array 12 is set on the above-described predetermined illumination optical axis A in the light guide 2.

Figure 12:
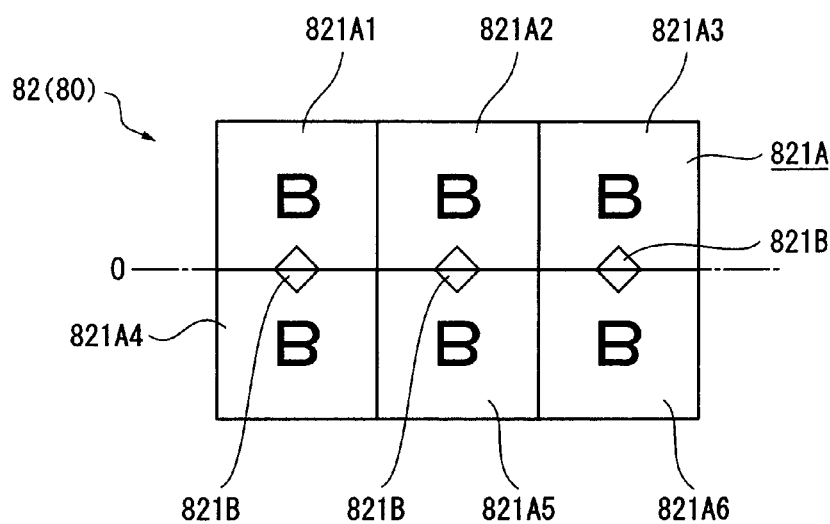
FIG. 12 is a schematic illustration showing the mold face of the movable die according to the aforesaid embodiment.

Although not explained, the structure of the molding die 80 for producing six second lens arrays 13 is substantially the same as the structure explained above, the molding die 80 having a mold face 821A shown in FIG. 12. The character "B" shown in FIG. 12 has the same meaning as the character "B" explained in FIG. 7.

Advantages of Third Embodiment

According to the above-described third embodiment, the following advantages can be obtained in addition to the advantages substantially same as the above (3) to (7), (10) and (11).

(14) Six dies 821A1 to 821A6 corresponding to the shape of the first lens array 12 are formed in the molding die 80 for manufacturing the first lens array 12. Two or three lateral faces of the base 121 of the first lens array 12 molded by this molding die 80 are the bend-separation faces 121C. Accordingly, by press-molding the molten glass G with use of the molding die 80 and separating the molded article at the bend-separation face 121C, six first lens arrays 12 can be easily produced from the one molding die 80. This surely allows the mass-production of the first lens array 12 as well as the further cost reduction of the first lens array 12. In addition, the second lens array 13 are also producible by the molding die 80 having the same structure, thereby surely allowing the mass-production of the second lens array 13 as well as the further cost reduction of the second lens array 13.

(15) The dies 821A1 to 821A6 are arranged in the matrix form of 2 rows×3 columns while arranged to be symmetric with respect to the plane O passing the boundary line of each row. With this configuration, in the six first lens arrays 12 manufactured by the molding die 80, the upper lateral face of the base 121 is the press-working face 121D and the lower lateral face is the bend-separation face 121C. The protrusion 821B is formed at the boundary part of each row on the mold face 821A of the molding die 80. This protrusion 821B forms the recess 121E along the bend-separation face 121C on the lens face 121A of the base 121 of the first lens array 12. Accordingly, even though the first lens array 12 having the only one press-working face 121D as the external position reference face is included in the molded six first lens arrays 12, the first lens array 12 is properly held by a holder frame or the like by chucking the recess 121E of the bend-separation face 121C and pressing the press-working face 121D opposite to the bend-separation face 121C onto the holder frame.

Fourth Embodiment

Next, a fourth embodiment of the present invention will be described below with reference to the attached drawings.

In the following description, the components same as those in the first to third embodiments are indicated by the same reference symbols or numerals for omitting or simplifying the detailed description thereof.

According to the third embodiment, six dies corresponding to the shape of the first lens array 12 or the second lens array 13 are formed in the molding die 80.

Meanwhile, according to the fourth embodiment, three dies corresponding to the shape of the first lens array 12 and three dies corresponding to the shape of the second lens array 13 are formed on a mold face 921A of a movable die 92 of a molding die 90.

Figure 13:
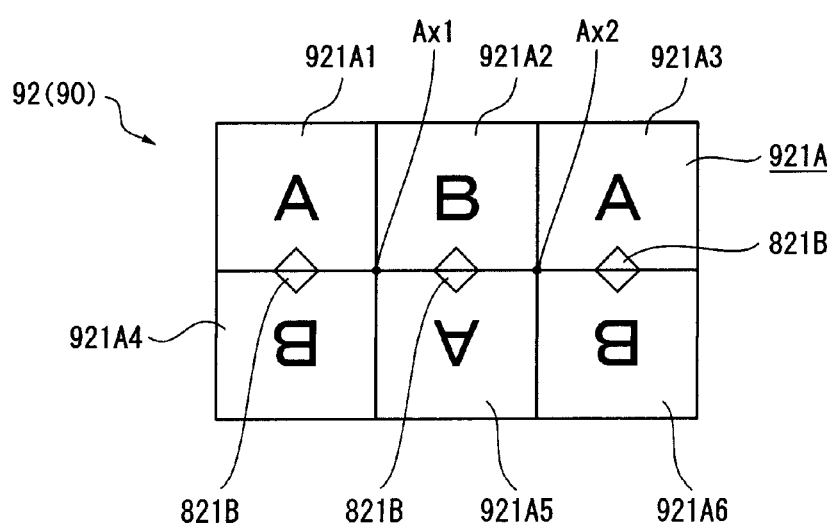
FIG. 13 is a schematic illustration showing a mold face of a movable die according to a fourth embodiment.

FIG. 13 is a schematic illustration showing the mold face 921A of the movable die 92 of the molding die 90 according to the fourth embodiment. The characters "A" and "B" shown in FIG. 13 have the same meaning as the characters "A" and "B" explained in FIGS. 6 and 7.

Referring to FIG. 13, the mold face 921A consists of three dies 921A1, 921A3 and 921A5 corresponding to the shape of the first lens array 12 and three dies 921A2, 921A4 and 921A6 corresponding to the shape of the second lens array 13.

These six dies 921A1 to 921A6 are arranged in a matrix form (of 2 rows×3 columns) just like the dies 821A1 to 821A6 in the third embodiment while arranged to be adjacent to different type dies as shown in FIG. 13. The four adjacent dies 921A1, 921A2 and 921A4 and 921A5, and the four adjacent dies 921A2, 921A3, 921A5 and 921A6 are arranged to be symmetric about rotation axes Ax1 and Ax2 under a 180- degree rotation, the rotation axes Ax1 and Ax2 passing a cross-points of the boundary lines of the each group of four dies.

Other configurations are same as the third embodiment, and the steps for manufacturing the lens arrays 12 and 13 with use of the molding die 90 as well as the steps for holding the manufactured lens arrays 12 and 13 with use of the holder frame (not shown) are same as the third embodiment. Therefore, the description thereof will be omitted.

Advantages of Fourth Embodiment

According to the above-described fourth embodiment, the following advantages can be obtained in addition to the advantages substantially same as the above (3) to (7), (10), (11) and (15).
(16) Three dies 921A1, 921A3 and 921A5 corresponding to the shape of the first lens array 12 and three dies 921A2, 921A4 and 921A6 corresponding to the shape of the second lens array 13 are formed in the molding die 90. Two lateral faces of the lens arrays 12 and 13 are bend-separation faces. Accordingly, by press-molding the molten glass G with use of the molding die 90 and separating the molded article at the bend-separation face, three first lens arrays 12 and three second lens arrays 13 can be easily produced from the one molding die 90 at a time. This surely allows the mass-production of the first lens array 12 and the second lens array 13 as well as the further cost reduction of the first lens array 12 and the second lens array 13.
(17) The dies 921A1 to 921A6 are arranged in the matrix form (of 2 rows×3 columns) while arranged to be adjacent to different type dies. The four adjacent dies are arranged to be symmetric about rotation axes Ax1 and Ax2 under a 180-degree rotation, the rotation axes Ax1 and Ax2 passing the cross-points of the boundary lines. With this configuration, in each same type lens array 12 and 13 molded by the molding die 90, the upper lateral face of out of the four lateral faces of each of the bases 121 and 131 can be the press-working face and the lower lateral face can be the bend-separation face. Accordingly, the same type lens arrays 12 and 13 can be positioned by a holder frame or the like in the same direction.

Modifications of Embodiments

While the present invention is described referring to preferred embodiments in the above, the present invention is not limited to these embodiments but includes various improvements and modifications of the design as long as the object of the present invention is achieved.

Although the molding dies 60, 70, 80 and 90 for producing two sets (2 rows×1 column) and six sets (2 rows×3 columns) of the first lens array 12 and/or the second lens array 13 are described in the above embodiments, the configuration is not limited thereto. In this invention, the molding die may have dies for 2×(1+n) sets of lens array, and the dies may be arranged in 2 rows×(1+n) columns, where n represents a natural number including zero.

Figure 14A:
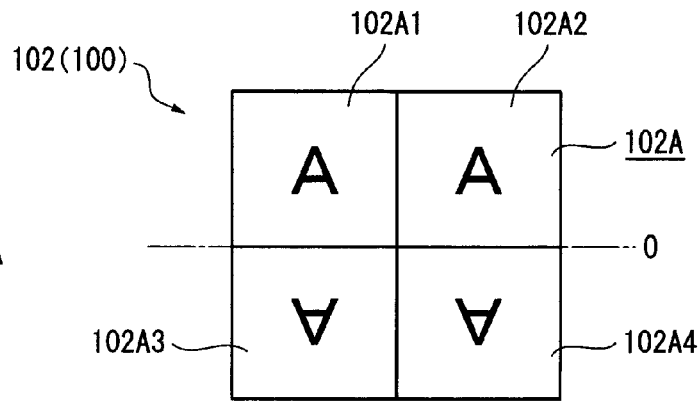
FIGS. 14A to 14C are illustrations each showing a modification of the aforesaid embodiments.
Figure 14B:
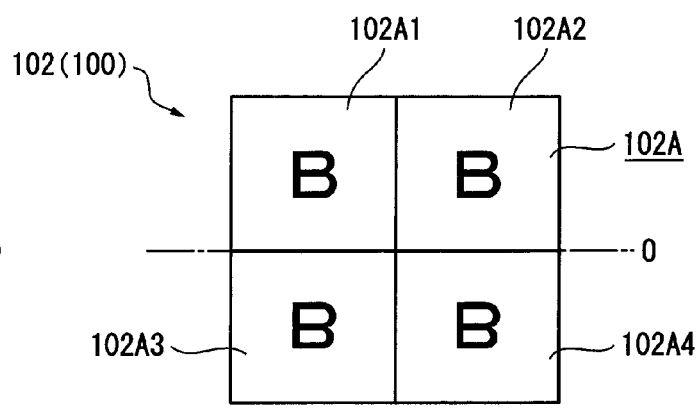
Figure 14C:
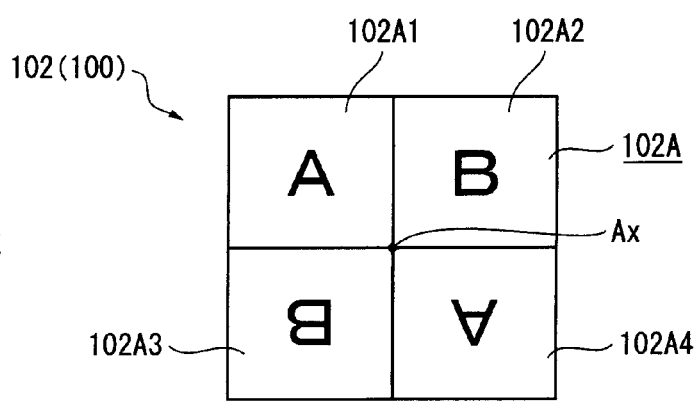

For example, FIG. 14A to FIG. 14C are schematic illustrations each showing a mold face 102A of a movable die 102 in a molding die 100 for molding four lens arrays. Specifically, FIG. 14A shows the mold face 102A of the molding die 100 for producing four first lens arrays 12. FIG. 14B shows the mold face 102A of the molding die 100 for producing four second lens arrays 13, and FIG. 14C shows the mold face 102A of the molding die 100 for producing two first lens arrays 12 and two second lens arrays 13 (four lens arrays, in total).

An example for manufacturing the same type lens array 12 or 13 is shown in FIGS. 14A and 14B. According to this example, in the molding die 100, the dies 102A1 to 102A4 are arranged to be symmetric with respect to a plane O passing the boundary line of each row.

An example for manufacturing different types first lens arrays 12 and the second lens arrays 13 is shown in FIG. 14C. According to this example, in the molding die 100, the dies are arranged to be adjacent to different type dies while the four adjacent dies arranged to be symmetric about a rotation axis Ax under a 180-degree rotation, the rotation axis Ax passing a cross point of the boundary lines of the four adjacent dies 102A1 to 102A4.

As another example, FIG. 15 schematically shows a mold face 112A of a movable die 112 of a molding die 110 for forming eight or more lens arrays.

Respective dies may be arranged to be symmetric with respect to a plane O passing a boundary line of each row, or may be arranged to be symmetric about rotation axes Ax1, Ax2, Ax3 . . . under a 180-degree rotation, the rotation axes passing the cross points of the boundary lines. That is, in the case that respective dies are arranged to be symmetric, the pressure applied to the molten glass G during the press-working is easily uniformed, and consequently the accuracy of the lens can be improved. Also, by arranging the respective dies to be symmetric, the lens arrays can be positioned in the same direction when the lens arrays are fixed in the holder frame or the like.

In addition, for molding eight or more lens arrays like the above case, a protrusion 112B having the same arrangement position and configuration as the protrusion 821B described in the third embodiment is formed on a mold face 112A as shown in FIG. 15. Then, a recess of the lens array formed by the protrusion 112B is chucked, and the lens array is positioned while referring to a press-working face opposite to the recess as the external position reference face and thus held by the holder (frame not shown). The same type protrusion may be formed on the mold face 102A of the molding die 100 for forming four lens arrays shown in FIGS. 14A to 14C.

In the third and fourth embodiments and the modifications described with reference to FIGS. 14A to 14C as well, the respective dies may be arranged to be symmetric with respect to a plane O passing a boundary line of each row, or may be arranged to be symmetric about the rotation axes Ax1, Ax2, Ax3 . . . under a 180-degree rotation, the rotation axes passing the cross points of the boundary lines.

Regarding the first and second embodiments, although the respective dies are arranged to be symmetric with respect to the plane O passing the boundary line of each row, the dies may be arranged to be symmetric a rotation axis under a 180-degree rotation, the rotation axis passing the center of the boundary line of each row.

Although the dummy areas 122C and 132C are respectively formed along the outermost small lenses 122A1 and 132A1 on the first lens array 12 and the second lens array 13, the configuration is not limited thereto. For example, in the mold faces 621A, 721A, 821A and 921A, the dummy area may be formed along the four lateral faces of the respective mold faces 621A, 721A, 821A and 921A. By forming the dummy area at least this section, even when a drop is formed on the outer periphery of the mold face during the press-molding, each lens area of a plurality of lens arrays can be highly accurate, thereby enabling a production of a highly accurate lens array with a minimum dummy area.

The protrusions 821B is formed on the mold face 821A of the movable die 82 for producing six first lens arrays 12 in the third embodiment, the configuration is not limited thereto.

For instance, a protrusion may be formed on the mold face as the upper face of the stationary die 61. The same applies to the case of producing six second lens arrays 13, and to the case of producing three first lens arrays 12 and three second lens arrays 13 (six lens arrays, in total).

Figure 16:
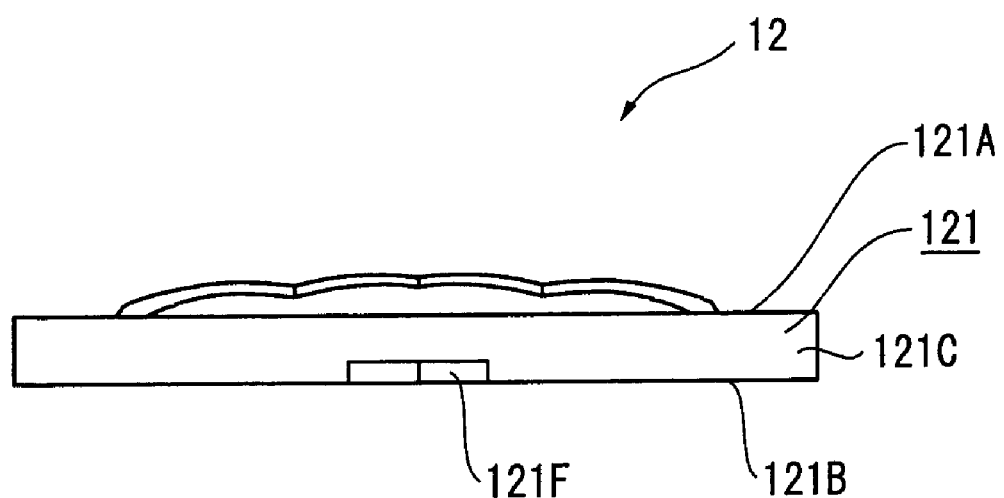
FIG. 16 is an illustration showing a further modification of the aforesaid embodiments.

FIG. 16 shows an illustration showing a lower side of a first lens array 12 molded in a stationary die 61 having a protrusion on the mold face thereof. In FIG. 16, the lateral face at the lower side of the first lens array 12 is a bend-separation face 121C.

With the use of the stationary die 61 having the protrusion on the mold face thereof, a recess 121F is formed along the bend-separation face 121C on a non-lens face 121B of a base 121 of the first lens array 12 as shown in FIG. 16. As in the case of the third embodiment, the first lens array 12 having the recess 121F is positioned while referring to the recess 121F and a press-working face opposite to the recess 121F, and thus held by a holder frame (not shown).

A recess may be formed instead of forming the protrusion on the mold face of the stationary die 61 or the movable die 82. In this case, a protrusion corresponding to the recess is formed on the first lens array 12 molded on the mold face having the recess. The first lens array 12 having the protrusion is positioned with reference to the protrusion and a press-working face opposite to the protrusion and thus held by a holder frame (not shown).

If using a method for optically aligning the positions of the first lens array 12 and the second lens array 13 in accordance with a light beam passing through a predetermined cell, the recess and the protrusion are unnecessary. In such case, the press-working face having a lower precision is acceptable.

In the above embodiment, the configuration and the shape of the first lens array 12 and the second lens array 13 are not limited to those in the above-described embodiments.

For instance, a plurality of small lenses 122A and 132A may be formed to have the same number of row and column. In such configuration, the molding of the lens arrays 12 and 13 are further facilitated, thereby further reducing the production cost.

The respective peak points of the chamfers 122E and 132E most distant from the lens faces 121A and 131A of the bases 121 and 131 may be higher than the respective peak position of the small lenses 122A and 132A most distant from the lens faces 121A and 131A.

In the above embodiments, the arrangement direction of the respective dies formed on the mold faces 621A, 721A, 821A and 921A is not limited to the arrangement direction described in the above embodiments, but the respective dies may be formed in other arrangement directions.

Although the second lens array 13 and the superposing lens 15 are independently used in the first to fourth embodiments and the above modifications of each embodiment, their functions may be integrated in one lens array. In such case, the lens array may be arranged on the light-incident side or the light-irradiation side of the polarization converter 14. If the lens array is arranged on the light-irradiation side of the polarization converter 14, each sub-beam is doubled at polarization-converting element array 143 to be spitted into a polarized light P and a polarized light S. Therefore, it is preferable that the number of the lens of the lens array is doubled from that of the second lens array 13. By substituting one lens array for the second lens array 13 and the superposing lens 15, the number of components can be reduced while the cost can be further lowered.

As a common advantage of all the embodiments, the dummy area formed on an outer cell section can eliminate negative effects due to low-filling volume at the molding. Accordingly, the first lens array 12 can condense the transmitted illumination light on the second lens array 13 without any loss, thereby minimizing an ineffective area of the superposed illumination to the illumination area of the liquid crystal panel 42 and thus improving the illumination efficiency. As for the second lens array 13, the deviation of optical axis of the outermost cells is minimized, and thereby improving the illumination efficiency.

If making the thickness of the bases 121 and 131 higher than the each small lens 122A and 132A, the parts corresponding to the bases 121 and 131 are lower than the parts corresponding to each small lens 122A and 132A, thereby facilitating the cutting and grounding process. With this configuration, a plurality of dies for one set is integrally formed to be a die for plurality of sets.

Although a projector using three optical modulators are taken as an example in the above embodiments, the present invention may be applied to a projector using a single optical modulator, two optical modulators or more than three optical modulators.

Although a liquid crystal panel is used as the optical modulator in the above embodiments, an optical modulator other than the liquid crystal panel such as a device using a micromirror may be used.

Although a transmissive optical modulator having different light-incident side and light-irradiation side is used in the above embodiments, a reflective optical modulator having common light-incident side and light-irradiation side may be used.

Although a front-type projector that projects an image in a direction for observing a screen is taken as an example in the above embodiments, the present invention may be applied to a rear-type projector that projects an image in a direction opposite to the direction for observing the screen.

Although the light source device of the present invention is installed in a projector in the above embodiments, the light source device may be installed on other optical equipments.

The best configuration for practicing the best mode of the present invention is disclosed in the above description, the present invention is not limited thereto. In other words, although the present invention has been described with reference to specific embodiments and drawings thereof, various modifications in shapes, materials, quantity and other configuration details may be made to the disclosed embodiments by those of ordinary skilled in the art without departing from the spirit and scope of the invention.

Since the description limiting to the shapes and the materials disclosed above is intended to be illustrative for easier understanding and not to be limiting the invention, the present invention includes descriptions of materials without all or a part of the limitation of the shapes and the materials.

What is claimed is:

1. A method for manufacturing a lens array including a base with a shape of substantially rectangular plate, and a dome-shaped lens section formed on one face of the base and having a plurality of small lenses, the method comprising:
   press-molding a molten optical material in a molding die in which a plurality of dies corresponding to the lens array are formed to form a molded article in which a plurality of lens arrays are integrated;
   removing the molded article from the molding die after the press-molding; and
   separating adjacent lens arrays by bending at a boundary thereof, wherein dies corresponding to 2×(1+n) sets of the lens array are formed in the molding die, and the dies are arranged in a matrix of 2 rows×(1+n) columns, wherein n represents 0 or 1, wherein a projection is formed along a boundary between the dies at a bend separation face, wherein the dies have a step that is projected or recessed at a boundary between the rows spanning respectively over two of the dies arranged in columns, and wherein, in the press molding, at least two lateral faces, excluding the bend-separation face separated by bending the lens arrays, are press-molded as external position reference faces and a recess or a protrusion is formed by the step on one side of the base spanning over the boundary of adjacent ones of the lens arrays at the bend separation face.

2. The manufacturing method of the lens array according to claim 1, wherein dies corresponding to a plurality of types of lens array different in optical function are formed in the molding die.

3. The manufacturing method of the lens array according to claim 1, wherein the dies arranged in the matrix of 2 rows×(1+n) columns are symmetric with respect to a plane passing a boundary line of each row.

4. The manufacturing method of the lens array according to claim 1, wherein four dies corresponding to the lens array are formed, and wherein the four dies are symmetric about an axis passing a cross point of boundary lines of the respective dies, under a 180-degree rotation.

5. The manufacturing method of the lens array according to claim 1, wherein two dies corresponding to the lens array are formed in the molding die, and the dies are symmetric about a rotation axis under a 180-degree rotation, the rotation axis passing the center of a boundary line of each row.

6. A method for manufacturing a lens array including a base with a shape of substantially rectangular plate, and a dome-shaped lens section formed on one face of the base and having a plurality of small lenses, the method comprising:

press-molding a molten optical material in a molding die in which a plurality of dies corresponding to the lens array are formed to form a molded article in which a plurality of lens arrays are integrated;

removing the molded article from the molding die after the press-molding; and separating adjacent lens arrays by bending at a boundary thereof, the boundary being a recess formed by a projection in the molding die during the press-molding, wherein dies corresponding to 2×(1+n) sets of the lens array are formed in the molding die, and the dies are arranged in a matrix of 2 rows×(1+n) columns, wherein n represents 0 or 1, wherein a projection is formed along a boundary between the dies at the bend separation face, wherein the dies have a step that is projected or recessed at a boundary between the rows spanning respectively over two of the dies arranged in columns, and wherein, in the press molding, at least two lateral faces, excluding the bend-separation face separated by bending the lens arrays, are press-molded as external position reference faces and a recess or a protrusion is formed by the step on one side of the base spanning over the boundary of adjacent ones of the lens arrays at the bend separation face.

* * * * *